United States Patent [19]
Carter et al.

[11] Patent Number: 5,529,053
[45] Date of Patent: Jun. 25, 1996

[54] VENTURI AIR DISTRIBUTED "TURBO GRILL"

[76] Inventors: Robert Carter, 177 Sparkleberry La. #716, Columbia, S.C. 29223; James A. Ballentine, Sr., 2235 Muller Rd., Blythewood, S.C. 29016; Vance M. Patterson, 505 Wotan Rd., Columbia, S.C. 29223

[21] Appl. No.: 344,181

[22] Filed: Nov. 14, 1994

[51] Int. Cl.⁶ .................................................. F24B 3/00
[52] U.S. Cl. ........................................ 126/25 R; 126/9 R
[58] Field of Search ................................ 126/25 R, 9 R

[56] References Cited

U.S. PATENT DOCUMENTS

| | | | |
|---|---|---|---|
| 246,561 | 8/1881 | Sassinot et al. | 126/25 R |
| 3,664,321 | 5/1972 | Chiou | 126/9 R |
| 4,322,049 | 3/1982 | Holland et al. | 126/25 R |

Primary Examiner—Carroll B. Dority

[57] ABSTRACT

A barbecue grill having a venturi shaped body. Inner and outer spaced rings are attached to a support pan and the body respectively. A removable support column attaches the support pan to a base. A dome shaped grill is supported on the venturi shaped body.

2 Claims, 7 Drawing Sheets

BOTTOM

VENTURI AIR DISTRIBUTED "TURBO GRILL"

FIELD OF INVENTION

The instant invention relates generally to barbecue grills and more specifically it relates to a grill which uses the action of air movement as it is heated and exits through a venturi shaped outlet.

DESCRIPTION OF THE PRIOR ART

Numerous barbecue grills have been provided in prior art that are adapted to use a stationary or portable base, supporting a column with a housing of some type, containing a support for heat generating material. This material may be in the form of charcoal briquets, a gas burning diffuser or electrical coil, all generating heat enough to cook food supported on a grill or rotisserie. While these units may be adequately functional for the purpose to which they address, they have short commings which the present invention heretofore described addresses and corrects.

SUMMARY OF THE INVENTION

A primary object of the present invention is to provide an improved method of cooking outdoors over an open radiant surface by overcoming the shortcomings of the prior art devices.

Another object is to provide a cooking surface which is evenly heated. To accomplish this the housing or body of the grill has a venturi outlet which causes the heated air to circulate under the entire cooking surface, even where there is no charcoal, flame or heating element.

Another object of the invention is to maximize the utility of the radiant heat required for cooking by the even distribution of the heat. This will economize the energy necessary for cooking outdoors.

Another object of the invention is to maximize the utility of the cooking surface by providing a dome shaped grill.

Another object is to provide a heavy duty grill which is truly portable. The unit can be easily disassembled and packed for easy transport and reassembly. When assembled the grill can be easily rolled about on its "stroller" base which has a handle and two heavy duty wheels.

A still further object is to provide a portable grill that is economical in cost to manufacture. Further objects of the invention will appear as the description proceeds.

To the accomplishment of the above and related objects, this invention will be illustrated in the following drawings. However, the drawings are illustrative only, and changes may be made in the actual construction of the invention which will be described within the scope of the appended claims.

BRIEF DESCRIPTION OF THE DRAWING FIGURES

DETAILED DESCRIPTION OF THE PREFERRED EMBODIMENTS

Figure 1:
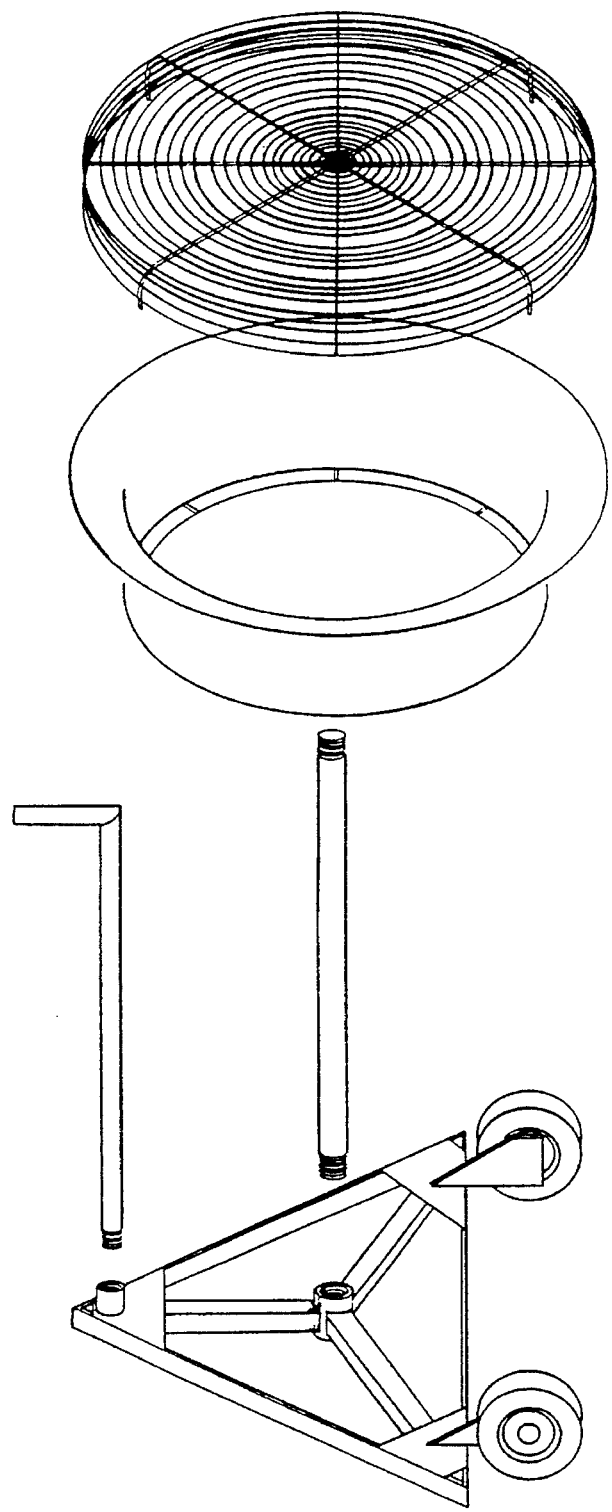
FIG. 1 is a perspective view of the instant invention.
Figure 2:
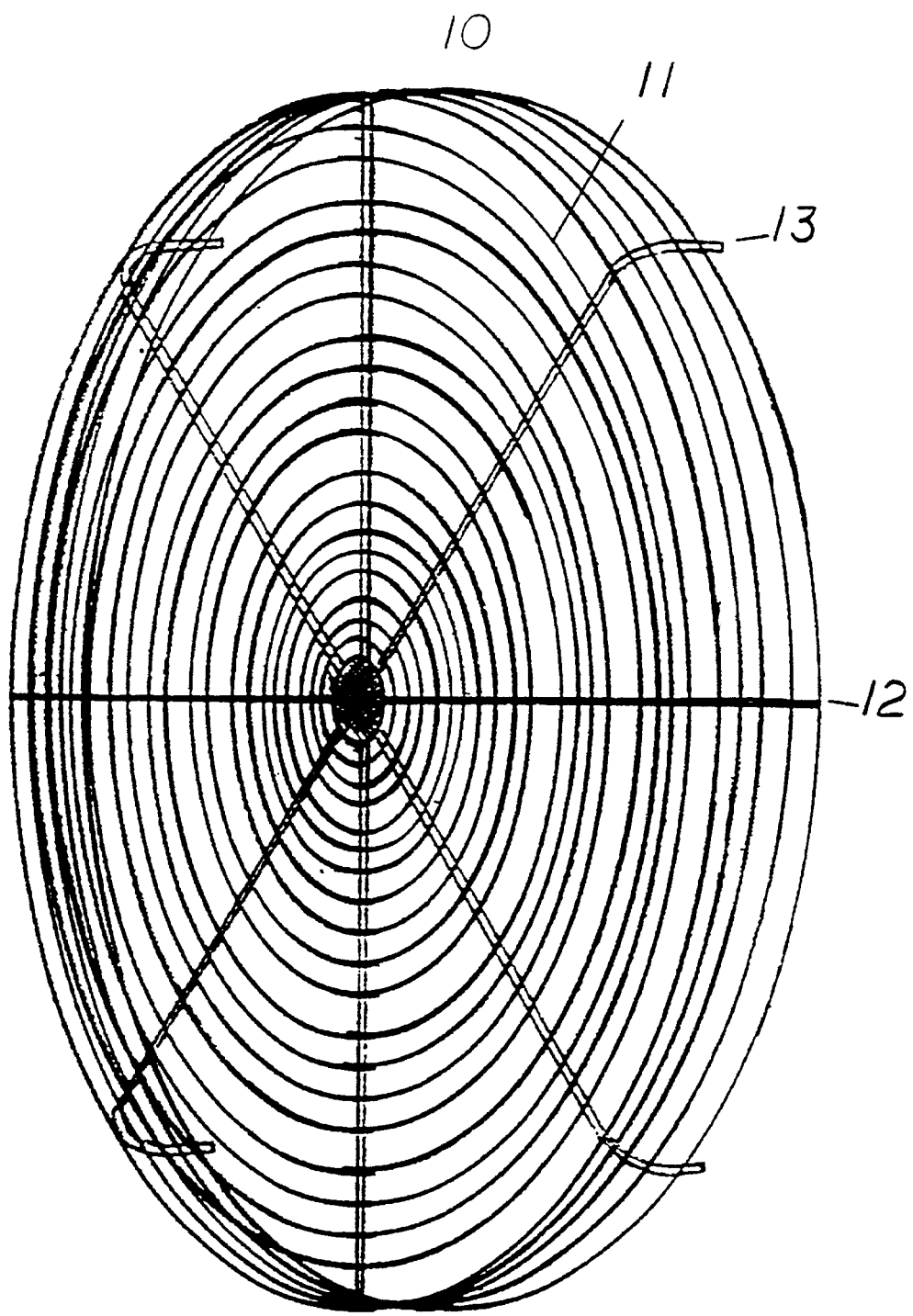
FIG. 2 is an enlarged view of the domed cooking surface.
Figure 3:
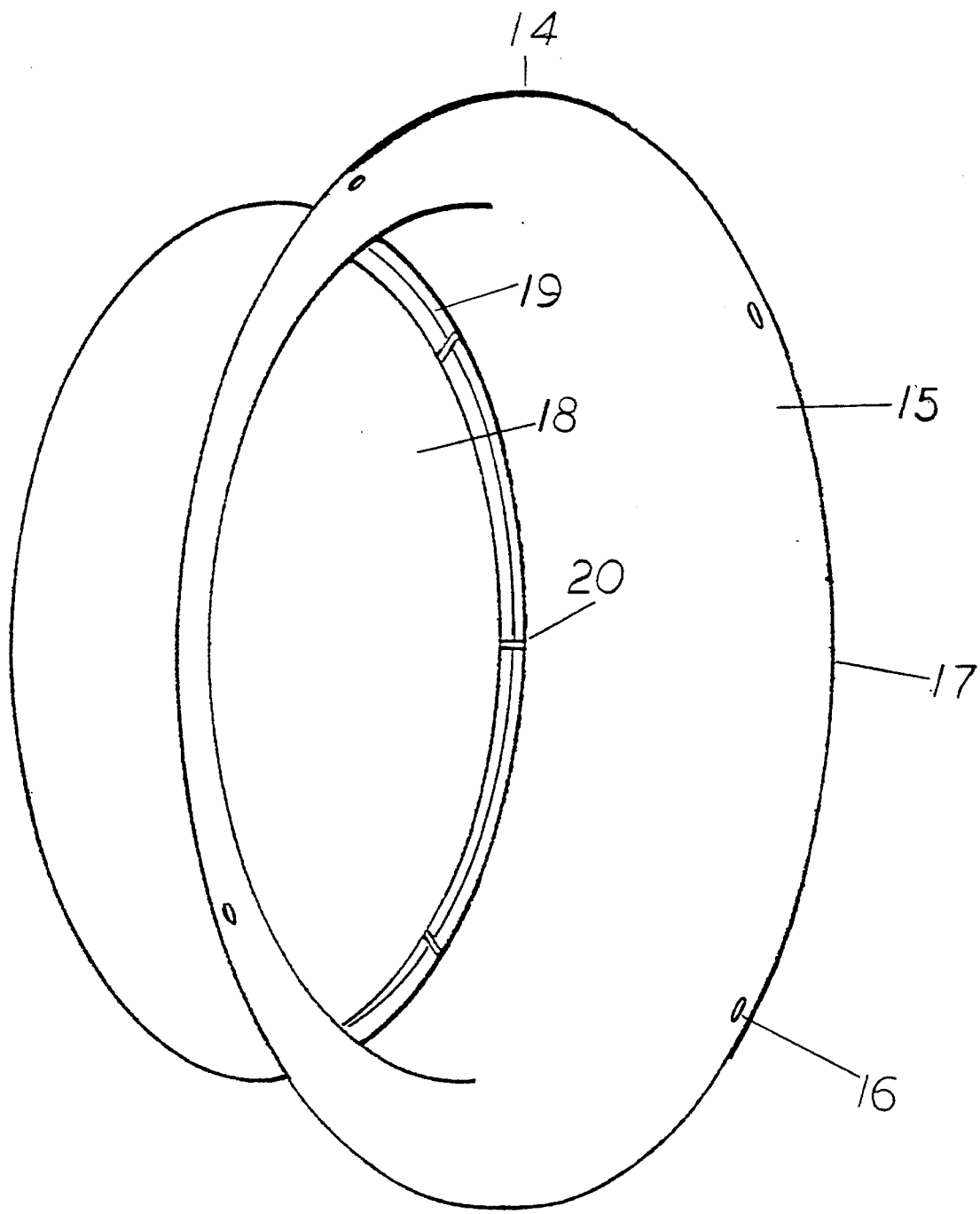
FIG. 3 is an enlarged view of the body of the grill.

Turning now descriptively to the drawings, the Figures illustrate a barbecue grill which consists of a dome shaped cooking surface, FIG. 2. This cooking surface is made of heavy gauge steel rings 11 welded to steel braces 12. These braces 12 are elongated at four points 13 to allow the cooking surface 10 to be attached to the body of the grill 14. These elongated braces 12 will pass through four holes in 14 at 16 and will allow the cooking surface to be easily secured in place or removed for cleaning and, transport.

Figure 4:
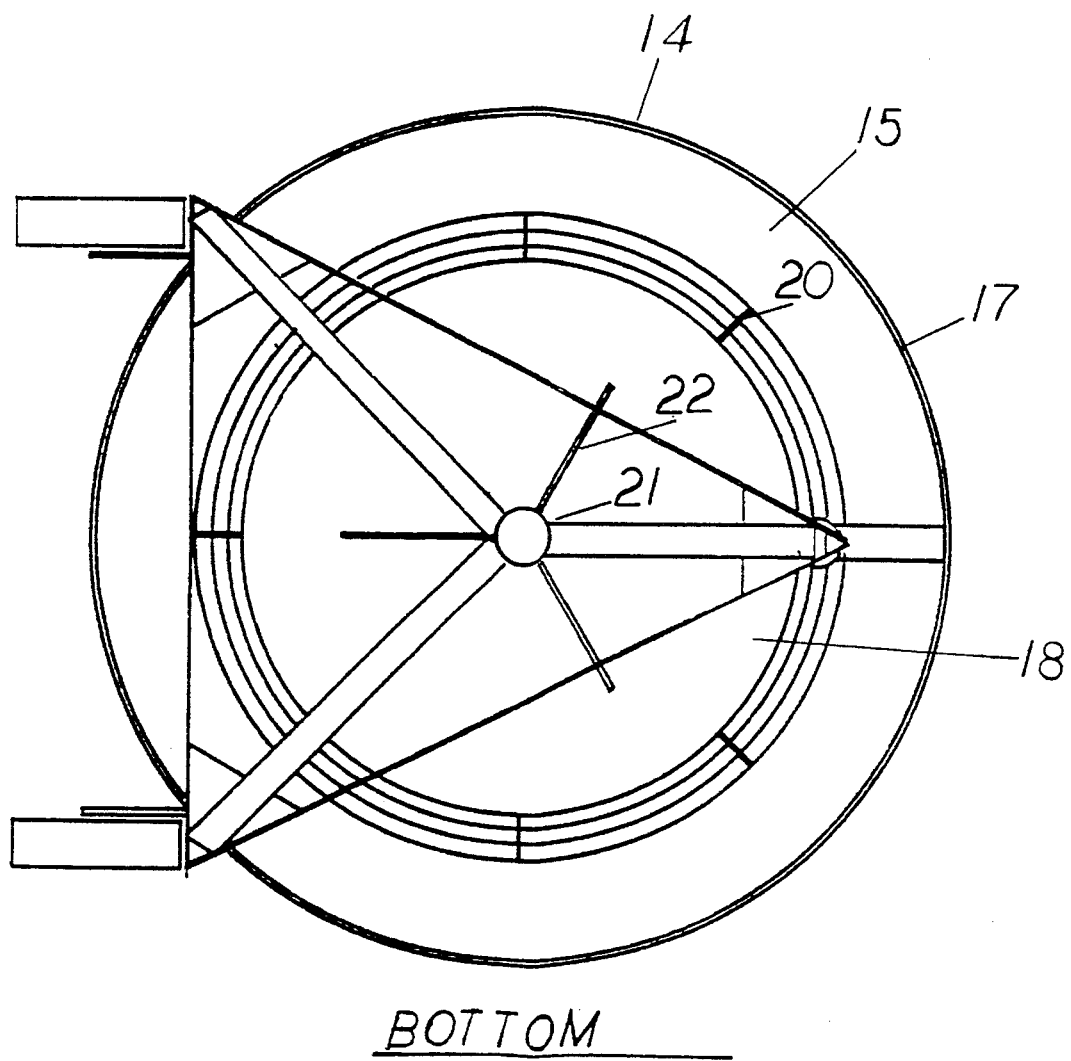
FIG. 4 is and underview of the body of the grill.
Figure 5:
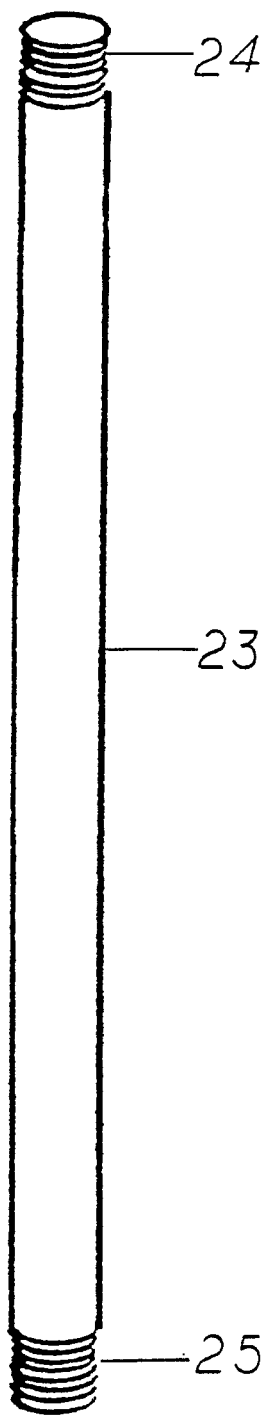
FIG. 5 is an enlarged view of the support column.

The body of the grill 14 (FIG. 2) is venturi shaped 15 from the midway point of the body to the upper edge or lip 17 where it is rolled under. The bottom of the body 14 (FIG. 4) has a support ring inner and outer for the briquettes, which is made up of steel rings 19 welded to steel braces 20 the outer ring being welded to the body 14. A support pan 18 is attached to the support the inner ring 19 and 20. Welded to the support pan 18 is a threaded collar 21 which has increased support with the three flanges 22 of steel welded to the collar 21 and transport.

The steel support column 23 (FIG) is threaded on the top 24 to easily screw into the collar 21. The column can vary in length depending on whether the base is portable or secured to the ground. The support column 23 is threaded on the bottom 25 to easily screw into the base 26 at the threaded collar 27. The threaded top and bottom of the support column 23 allows the column to be easily removed for transport.

Figure 6:
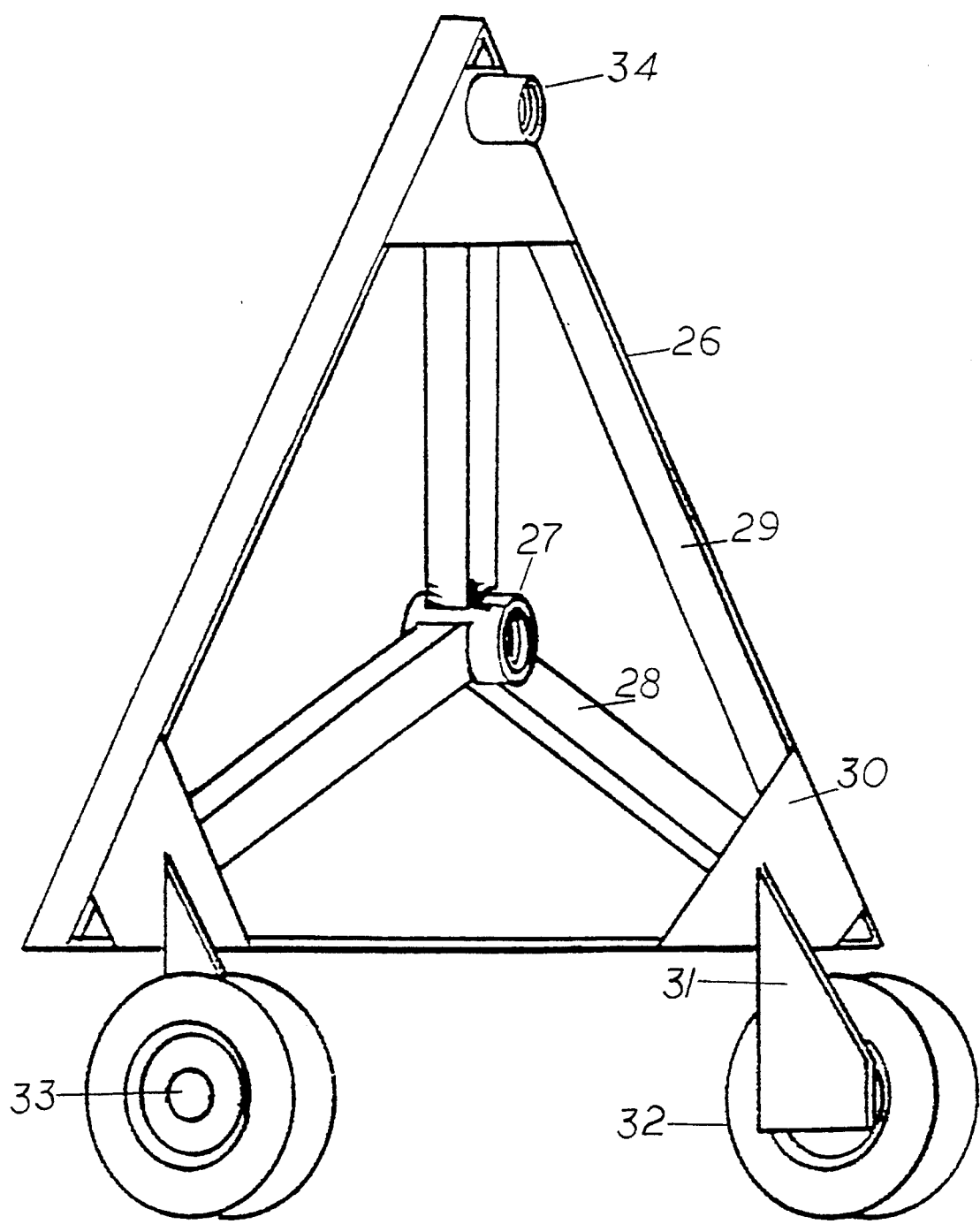
FIG. 6 is an enlarged view of the portable support base.
Figure 7:
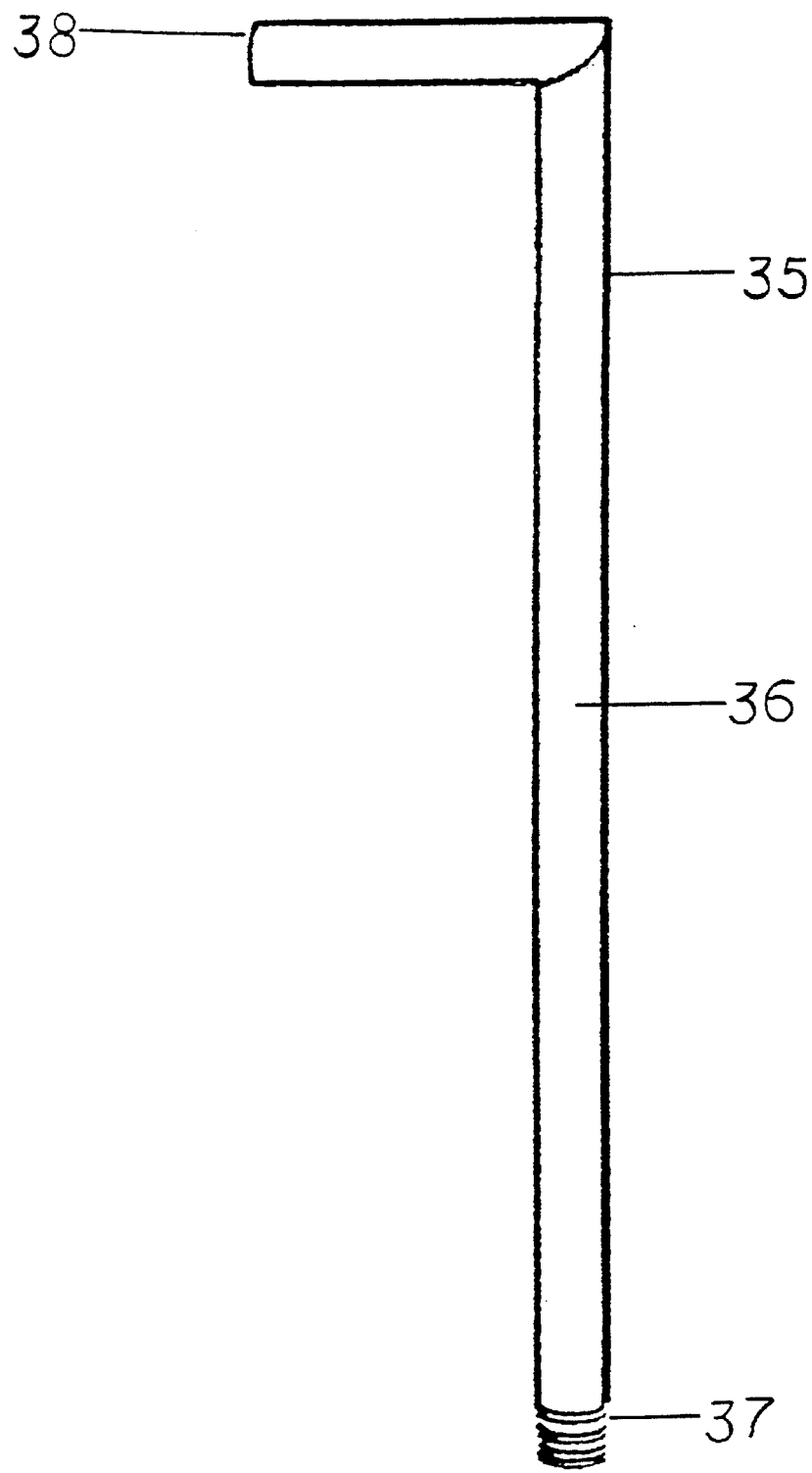
FIG. 7 is an enlarged view of the handle

The steel handle 35 (FIG. 6) is threaded on the bottom to easily screw into the base 26 (FIG. 7) at the threaded collar 34. The handle grip 38 is welded to the shaft 36. The steel handle 35 is easily removed for transport.

The portable base 26 (FIG. 7) consists of a threaded collar 27 which attaches the support shaft 23 and the body 14 to the portable base. The collar 27 is welded to square steel bracing 28. This bracing 28 is welded to flat steel bracing 29. The base is reinforced with steel bracing 30 at three points. The wheels 32 are supported by bracing 31 which are welded to the base 26. The wheels are attached to the support bracing 31 by a nut and bolt assembly 33 which allows the wheels to easily turn. There is a threaded coupling 34 welded to the base which allows the steel handle 35 to be attached.

LIST OF REFERENCE NUMBERS

10: dome shaped cooking surface
11: heavy gauge steel rings
12: steel braces
13: elongated braces
14: body of the grill
15: venturi shaped body
16: holes for elongated braces
17: upper rolled edge of body
18: briquette support pan
19: lower steel rings
20: lower steel braces
21: threaded support collar
22: support flanges
23: steel support column
24: top threading of support column
25: bottom threading of support column
26: portable base
27: threaded base collar for support column
28: square tube bracing
29: flat steel bracing 30: corner reinforcement
31: wheel supports
32: wheels
33: wheel nut and bolt axal assembly
34: threaded collar for handle
35: steel handle
36: handle shaft
37: bottom threading on handle
38: handle grip It will be understood each of the items described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A barbecue grill comprising: an annular body having an upper outwardly tapering venturi outlet, inner and outer rings connected by spaced braces, said outer ring being connected to a lower end of said annular body, said inner ring being connected to a support pan, means removably coupling a support column to said support pan and a support base, a dome shaped grill supported on an upper end of said annular body.

2. The barbecue grill of claim 1, wherein said support base includes wheels and a handle extending upwardly from said base.

* * * * *